United States Patent [19]

Conrad

[11] Patent Number: 4,650,144

[45] Date of Patent: Mar. 17, 1987

[54] HEAVY DUTY, STOWABLE APPARATUS FOR SUPPORTING ARTICLES

[76] Inventor: Elroy C. Conrad, 10 Twin Brooks Rd., Fairport, N.Y. 14450

[21] Appl. No.: 707,927

[22] Filed: Mar. 4, 1985

[51] Int. Cl.$^4$ ............................................. F16B 45/00
[52] U.S. Cl. .................................. 248/290; 248/304; 248/339
[58] Field of Search ........ 182/206; 248/290, 304–308, 248/211, 339, 341, 309.1, 309.2, 314, 324, 205.1; 211/87

[56] References Cited

U.S. PATENT DOCUMENTS

| | | | |
|---|---|---|---|
| 2,308,837 | 1/1943 | Roney | 182/117 |
| 2,482,873 | 12/1969 | Pivacek | 403/49 |
| 2,598,092 | 5/1952 | Alvey | 248/218 H |
| 3,357,670 | 12/1967 | Larson | 248/290 |
| 3,393,009 | 7/1968 | Tart | 297/349 |
| 4,195,808 | 4/1980 | Anderson | 248/219.1 |

*Primary Examiner*—Reinaldo P. Machado
*Assistant Examiner*—Alvin Chin-Shue
*Attorney, Agent, or Firm*—Martin LuKacher

[57] ABSTRACT

An arm which is hook shaped and has a vertical section and a foot section is secured in brackets which are attached to a wall of a support structure. The brackets are of sheet metal and are formed with opposed arcuate portions which define bearing surfaces. The vertical section of the arm is captured within the bearing surfaces by bolts which extend through the sides of the U-shaped members near their open ends. Pins and slots are provided in the U-shaped members and in the vertical section of the arm whereby the arm is supported with its foot section extending outwardly from the wall for carrying articles. By moving the arm vertically with respect to the U-shaped members so that the slots and pins clear each other, the arm may be rotated to a stowed position adjacent to the wall. Pluralities of such hook shaped arms may be attached to the wall, spaced horizontally from each other, for supporting heavy articles such as bicycles, boards and the like. Individual arms may be used for supporting automobile tires and the like.

13 Claims, 6 Drawing Figures

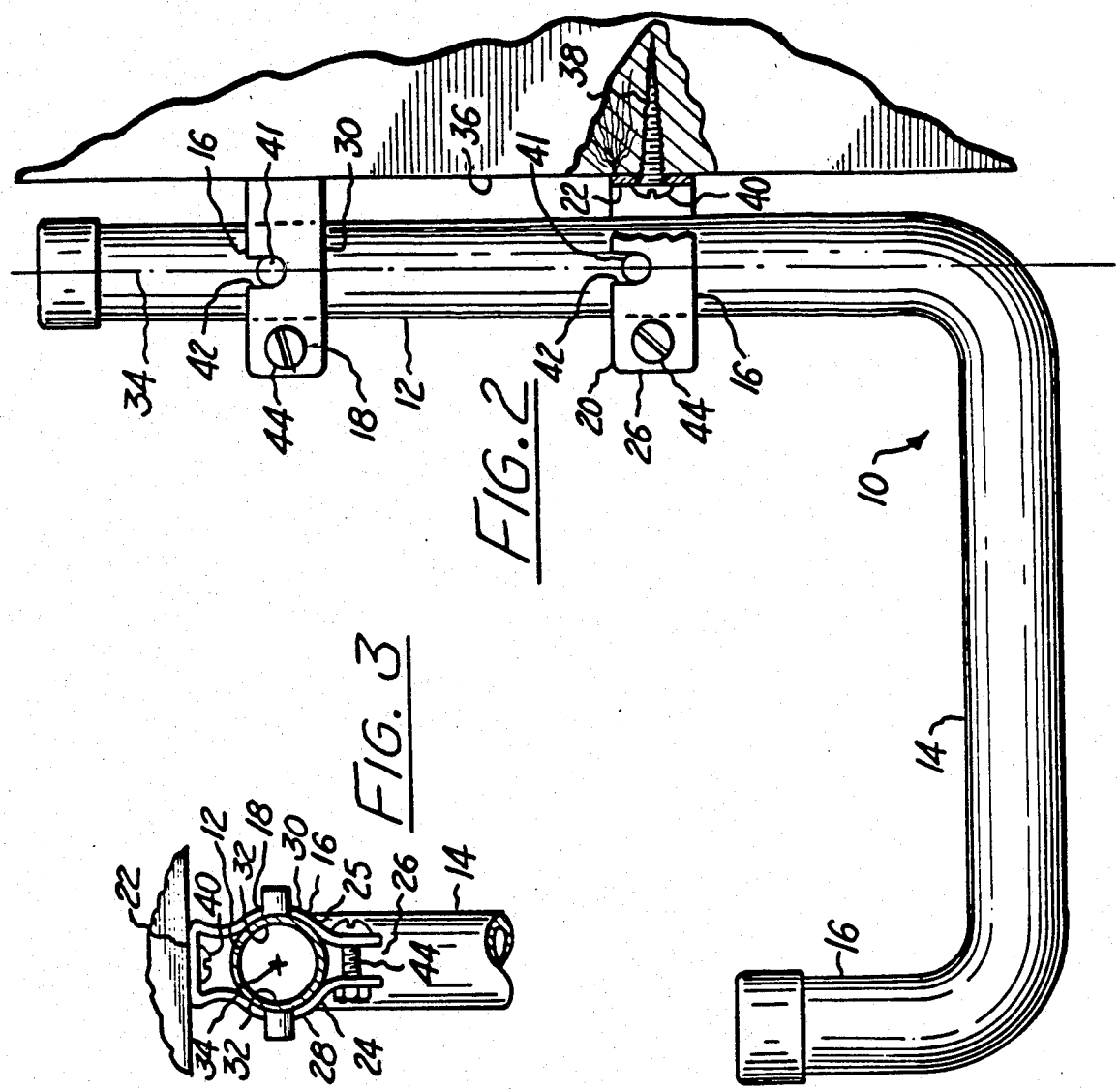
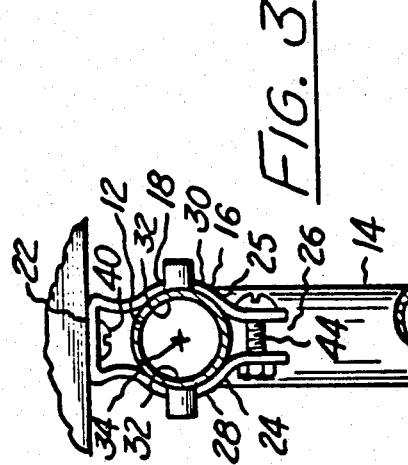
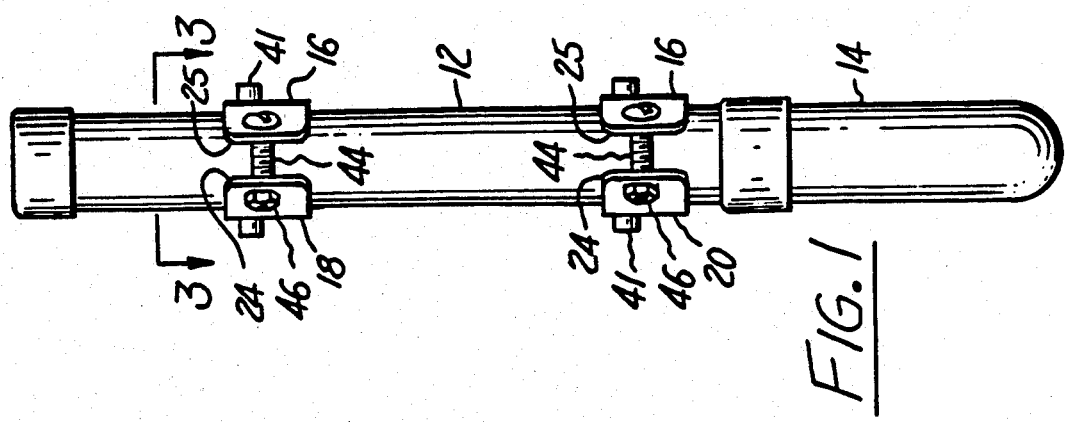

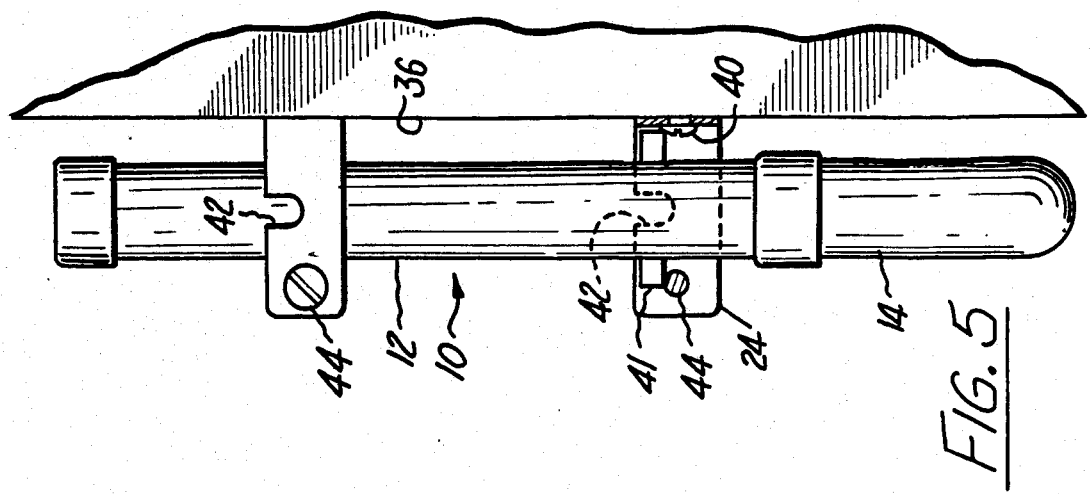
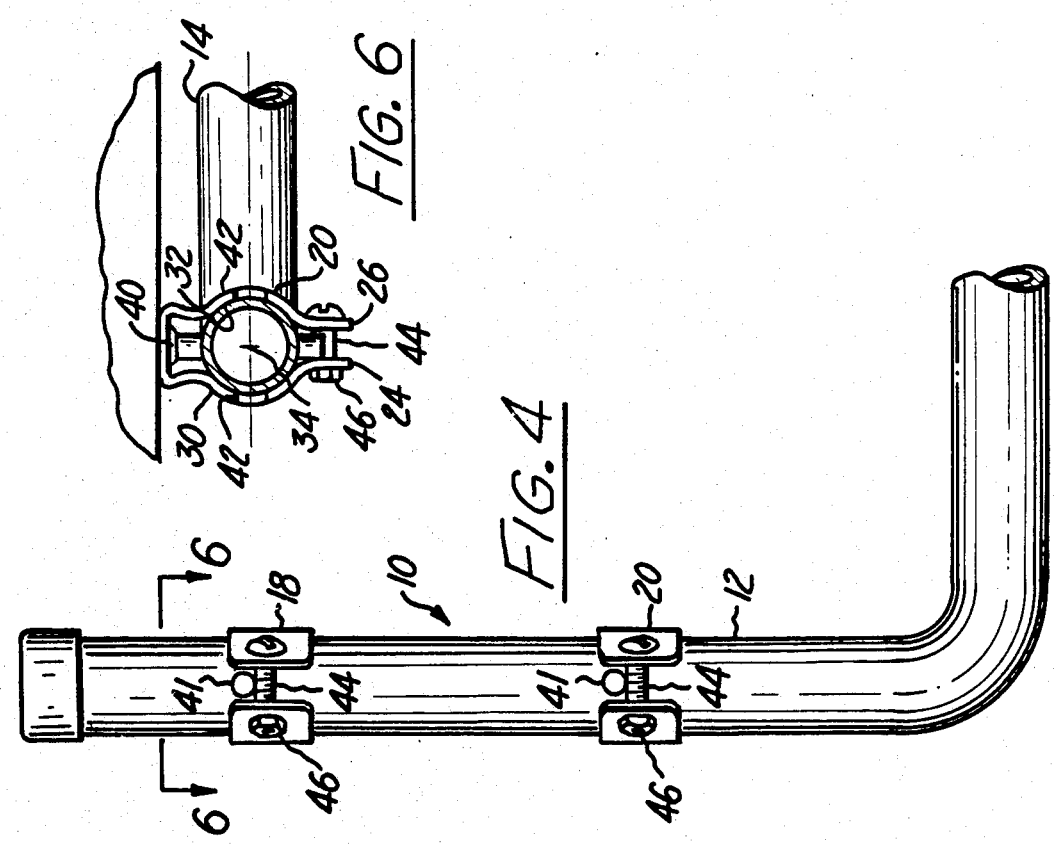

HEAVY DUTY, STOWABLE APPARATUS FOR SUPPORTING ARTICLES

DESCRIPTION

The present invention relates to apparatus for supporting articles and particularly to article supporting apparatus which can be locked in a supporting position extending outwardly from a wall and unlocked and stowed against the wall.

The invention is especially suitable for use in providing a heavy duty, stowable utility hook which may be mounted on a wall, for example in the studs of a garage, for holding articles such as boards, tires, and bicycles, and which may be turned and stowed against the wall when not so used.

It is the principal object of the present invention to provide improved article holding apparatus, capable of holding heavy articles which is not permanently in a position extending outwardly from the wall and can be located against the wall in stowed position, thereby providing clear and useful space when not in use.

It is a further object of the present invention to provide a heavy duty utility hook for holding articles which is stowable without removing the hook completely from the wall or support structure to which it is attached.

It is a still further object of the present invention to provide improved article supporting apparatus capable of supporting heavy articles which can be fabricated and installed at low cost.

Briefly described, apparatus for supporting an article which embodies the invention comprises bracket means which is attachable to the vertical wall of a support structure, such as a stud in the wall of a building. The bracket means has an opening with an internal bearing surface along a vertical axis, and an arm which has a vertical section and a foot section extending laterally from the vertical section. The arm is suitably shaped to define a hook for supporting the articles. The arm extends through and is captured within the internal bearing surface of the bracket means. The arm is moveable vertically, with respect to the bracket means, as well as rotationally. A slot and pin arrangement is provided. The pin is preferably in the vertical section of the arm and is perpendicular to the vertical axis as well as to the foot section of the arm. The slot is preferably in the bracket means and is in the form of notches diametrically opposed to each other in the bearing surface along diameters through the vertical axis generally paralleling the wall. Alternatively, the pin may extend from the bracket means through an elongated slot in the arm. The arm is moveable vertically so that the pin and slot clear each other. The arm may then be rotated to a stowed position against the wall. A plurality of arms and their attaching bracket means may be provided horizontally spaced from each other along the wall for supporting elongated objects, such as bicycles. Single arms and their bracket means may be used for supporting other articles, such as tires or wheels, which have openings therethrough.

The foregoing and other objects, features and advantages of the invention as well as a presently preferred embodiment thereof will become more apparent from a reading of the following description in connection with the accompanying drawings in which:

FIGS. 1, 2 and 3 are front, side and sectional views of a heavy duty, stowable utility hook embodying the invention shown in position where the hook is locked projecting outwardly from a supporting wall; and FIGS. 4, 5 and 6 are front, side and sectional views showing the hook which is illustrated in FIGS. 1, 2 and 3, but in stowed position against the wall.

Referring more particularly to the drawings, there is shown an arm 10 having a vertical section 12 and a horizontal foot section 14. The free end 16 of the horizontal action is bent so that the arm defines a hook. The arm is cylindrical in shape and has a circular cross section. Preferably the arm is a tube of metal, such as aluminum of sufficient wall thickness to support heavy loads, such as those often found in garages (tires, bicycles, boards and the like) without bending. The tube is bent around a 90° arc between the vertical 12 and horizontal 14 sections. In some cases the horizontal section need not be exactly horizontal but may form an angle less than 90° with the vertical section. This is especially advantageous when the apparatus is used for supporting tires. Alternatively, the hooked end of the horizontal section may be provided without a full 90° turn in the arm at the hooked end. This also advantageous when the apparatus is used for supporting wheels in order to make it easier to extend the hooked end of the arm through the opening in the center of the wheel, for example the hub receiving opening in a wheel on which a tire is mounted.

The vertical section 12 of the arm 10 is supported by bracket means 16 which extend into the wall of the support structure on which the apparatus is mounted. In general the bracket means supports the arm for both axial and rotational movement so that the arm can be located in extended position as shown in FIGS. 1, 2 and 3 or in stowed position with the horizontal or foot portion of the arm against the wall as shown in FIGS. 4, 5 and 6.

The vertical section 12 of the arm 10 is supported for rotational and axial movement in the bracket means 16. These bracket means are provided in accordance with the herein illustrated preferred embodiment of the invention by a pair of identical U-shaped members 18 and 20 made of sheet metal. These members are fabricated by stamping and bending out of the sheet steel. Each U-shaped member has a closed end 22 from which sides 24 and 25 extend to an open end 26. The sides have opposed arcuate portions 28 and 30 which define bearing surfaces 32 in which the vertical arm 12 is moveable along the vertical axis 34. The bearing surfaces 32 also support the arm 10 for rotation about this vertical axis 34. The closed end 22 of each U-shaped member 18 and 20 is attached to the wall 36 with a screw 38 having a screwhead 40 which extends into the U-shaped member, but is spaced from the surface of the arm so that there is a clearance therebetween, and no interference with the rotational or vertical movement of the vertical section of the arm. A slot is provided in the bracket means 16 for supporting the arm 10 by a pin 41 which extends through the arm. The pin is along a diameter of the arm. The slot is provided by the notches 42 which are opposed to each other along a diameter which is through the vertical axis defined by the bearing surface of the U-shaped member (the inner surface of the arcuate portions). This diameter is essentially parallel to the wall.

The vertical section 12 of the arm 10 is inserted between the sides of each U-shaped member 18 and 20. Then, the open ends of the sides are clamped together so as to capture the arm within the arcuate portions thereof. The clamping means in each member 18 and 20 is provided by a bolt 44 which extends through holes in the sides of the U-shaped member near the open end of the member. This bolt 44 is closed by a nut 46 so as to provide the necessary capturing action. Of course, there is sufficient clearance between the arm and the bearing surface 32 provided by the interior surface of the arcuate portions 28 and 30 of the U-shaped members 18 and 20 to allow the arm 10 to move along the vertical axis 34 as well as to rotate about the vertical axis 34. The location of the bolt 44 is such as to provide clearance between the bolt and the exterior surface of the arm. The pin 41 is long enough so as to extend, both past the sides 24 and 25 of the U-shaped member and not to clear the bolt 44 and the head 40 of the screw 38. The spacing in the vertical direction between the pins 41 is commensurate and preferably equal to the spacing between the U-shaped members 18 and 20.

It will be apparent that the bracket means 16, namely the U-shaped members 18 and 20, may be provided with pins which extend through a vertical slot in the vertical section of the arm.

When the hook shaped arm 10 is disposed with its foot section 14 extending perpendicular to the wall, the pins 41 bear against the lower ends of the notches 42. The pins 42 also lock the arm 10 against rotation. Heavy objects may be supported by the arm. Accordingly, the arm provides a heavy duty utility hook. A plurality, for example a pair, of arms 10 may be located spaced horizontally from each other. For example, two arms may be used on adjacent studs of the wall which may be 12 to 16 inches apart. Then heavy objects such as timbers, lawn mowers and other garden implements may be supported by the hooks. When the hooks are no longer needed, it is desirable that the space which is occupied by these hooks be cleared both for reasons of space utilization and to prevent accidental striking of the hooks as one moves about a garage or other work place. Then, the arm 10 is moved upwardly a sufficient distance so that the pins clear the notches. The arm 10 is then turned so as to bring the foot section 14 against the wall 36. The hook arm 10 is then in stowed position out of the way. In some instances it may be desired to allow the hooks to support certain objects, e.g., bags which may lie close to the wall. Then the engagement of the pins 41 with the head 40 of the screw 38 and the bolt 44 will provide sufficient support for the arm to prevent the arm 10 from moving out of the U-shaped members 18 and 20, and nevertheless support a considerable weight, such as the weight of the bag and its contents. This arrangement will also provide some support for the object being supported, even if the apparatus is not used in accordance with its accompanying instructions.

From the foregoing description it will be apparent that there has been provided an improved article supporting apparatus which is particularly suitable for use as a heavy duty, stowable utility hook. Variations and modifications in the herein described apparatus will undoubtedly suggest themselves to those skilled in the art. Accordingly, the foregoing description should be taken as illustrative and not in a limiting sense.

I claim:

1. Apparatus for supporting an article which comprises bracket means attachable to a support structure having a vertical wall, said bracket means being attachable at its back to said wall and having an opening therethrough with an internal bearing surface having a vertical axis, an arm having first and second sections, said second section defining a support for said article and said second section extending outwardly from said first section, said first section being disposed in said bracket means opening within said bearing surface for movement longitudinally along said vertical axis and for rotational movement about said vertical axis, said first section having a pin extending therethrough and defining at opposite ends of said pin which project from said first section a horizontally extending support surface at the lower side of said pin, said bracket means having notches for receiving said projecting ends of said pin and a horizontally extending surface at the rear thereof, said pin being engagable in said notches to support said arm with said second section thereof extending generally outward from said wall in an article supporting position and said pin being disengagable from said notches to enable said arm to be rotated about said vertical axis to bring said second section to a stowed position against said wall, said bracket means having a retaining member extending across the front thereof, said retaining member and said surface at the rear of said bracket means engaging said pin and defining a support for said first section against downward movement along said vertical axis when said arm is in said stowed position.

2. The apparatus according to claim 1 wherein said bracket means is a generally U-shaped member having a closed end and sides extending therefrom, said sides having portions opposed to each other which are generally arcuate and define said bearing surface, and means including said retaining member for clamping said sides together to close said sides around said first section and retain said first section within the said arcuate portions of said sides.

3. The apparatus according to claim 2 wherein said clamping means comprises a bolt extending through said side near the end of said U-shaped member opposite to said closed end thereof.

4. The apparatus according to claim 3 wherein said closed end of said U-shaped member is attached to said support structure wall with attachments having a head extending through said closed end in a direction along said sides partially toward said arcuate portion, said head providing said horizontally extending surface, and said bolt also being spaced from said arcuate portion along said sides, said pin being attached to and extending from said first section a sufficient distance to engage and be supported near the opposite ends thereof by said head and said bolt when said arm is in said stowed position.

5. The apparatus according to claim 4 wherein a pair of said bracket means are provided for attachment to said support structure spaced vertically from each other with the openings and bearing surfaces thereof in alignment along said vertical axis.

6. The apparatus according to claim 5 wherein said bracket means has sides extending generally parallel to said wall, the top edges of said sides extending generally perpendicular to said wall and having said notches therein for receiving said pins, said notches being opposed to each other, said notches in both of said bracket means being in alignment with each other.

7. The apparatus according to claim 1 wherein said bracket means are generally U-shaped members with opposed arcuate portions in the sides thereof defining said bearing surface in each of said bracket means, and clamping means including said retaining member attached to said sides at the open ends of said members for closing said sides to capture said first section therein.

8. The apparatus according to claim 7 wherein said arm is hook shaped for capturing articles on said second section.

9. The apparatus according to claim 8 wherein said second section has a foot portion perpendicular to said first section and is turned up at the end of said foot section opposite to said first section to define said hook.

10. The apparatus according to claim 1 wherein said arm is circular in cross section.

11. The apparatus according to claim 10 wherein said arm is a tube.

12. The apparatus according to claim 11 wherein said bracket means comprises a pair of U-shaped members of sheet metal spaced along said vertical axis and attached at the closed ends thereof to said support structure wall, said U-shaped members having sides between which said first section of said arm is located, said sides having opposed arcuate portions each having said notches opposed to each other along lines perpendicular to said vertical axis and generally parallel to the closed ends of said members, said notches extending from upper edges of said sides, said first section of said arm having pins also perpendicular to said vertical axis, said pins being spaced from each other vertically by distances approximately equal to the vertical spacing of said U-shaped members on said wall whereby said arm can be moved vertically until said pins clear said notches and rotate said towards said wall into said stowed position.

13. The apparatus according to claim 12 wherein a plurality of retaining members comprising bolts connected between said sides of said U-shaped members to bring said sides together and capture said arm, said bolts each providing support for said pins, said closed ends of said U-shaped members being attached to said support structure by screws having heads, said heads providing said horizontally extending surfaces, and said pins extending horizontally to engage said heads and said bolts when said arm is turned to stowed position and released.

* * * * *